United States Patent [19]

Hehl

[11] Patent Number: 5,634,334
[45] Date of Patent: Jun. 3, 1997

[54] HYDRAULIC DEVICE FOR USE IN A PRODUCTION MACHINE

[76] Inventor: Karl Hehl, Arthur-Hehl-Str. 32, D-72290 Lossburg, Germany

[21] Appl. No.: 491,129

[22] Filed: Jun. 16, 1995

Related U.S. Application Data

[63] Continuation-in-part of Ser. No. 135,980, Oct. 14, 1993, abandoned.

[30] Foreign Application Priority Data

Oct. 14, 1992 [DE] Germany .............. 42 34 647.9

[51] Int. Cl.⁶ ........................................... F16D 31/02
[52] U.S. Cl. .................. 60/328; 60/429; 91/363 R; 91/433; 91/526
[58] Field of Search .................. 91/361, 363 R, 91/420, 433, 435, 436, 526; 60/328, 417, 429, 452

[56] References Cited

U.S. PATENT DOCUMENTS

| | | | |
|---|---|---|---|
| 2,641,106 | 6/1953 | Jelinek | 60/417 |
| 2,677,238 | 5/1954 | Greer | 60/417 |
| 3,354,789 | 11/1967 | Schenkelberger | 91/526 |
| 3,357,451 | 12/1967 | Tennis | 91/436 |
| 4,080,872 | 3/1978 | Shiokawa | 91/436 |
| 4,164,167 | 8/1979 | Imai et al. | 91/433 |
| 4,537,029 | 8/1985 | Gunda et al. | 60/429 |
| 4,712,991 | 12/1987 | Hehl . | |
| 4,823,551 | 4/1989 | Hehl . | |
| 4,846,664 | 7/1989 | Hehl | 425/590 |
| 5,031,506 | 7/1991 | Baisch et al. | 91/363 R |
| 5,129,806 | 7/1992 | Hehl . | |
| 5,218,820 | 6/1993 | Sepehri et al. | 91/435 |

FOREIGN PATENT DOCUMENTS

| | | |
|---|---|---|
| 0 185 984 | 7/1986 | European Pat. Off. . |
| 31 19 095 | 9/1983 | Germany . |
| 34 47 709 | 4/1986 | Germany . |
| 40 18 334 | 11/1991 | Germany . |

*Primary Examiner*—F. Daniel Lopez
*Attorney, Agent, or Firm*—Spencer & Frank

[57] ABSTRACT

In a hydraulic device at least one control valve with at least three control positions is connected with a variable capacity pump, whereby the controlling device of the variable capacity pump is connected with the supply line downstream the control valve via a feedback line with the purpose of adjusting the pump output so as to maintain a constant operational pressure gradient. The back flow pipe is conducted over the control valve, which is connected with the consumers by connecting valves associated to mentioned consumers, whereby a transducer is associated to the back flow pipe, which together with the transducer of the supply line constitutes a regulating variable for a control unit. This way a precise and energy saving regulation or control of the consumers in both flow directions by a control valve at a reasonable price is achieved.

10 Claims, 5 Drawing Sheets

HYDRAULIC DEVICE FOR USE IN A PRODUCTION MACHINE

This application is a continuation-in-part of application Ser. No. 08/135,980, filed Oct. 14, 1993, ABN.

CROSS REFERENCE TO RELATED APPLICATIONS

This application claims the priority of German Patent Application No. 4234647.9, filed Oct. 14, 1992, which is incorporated herein by reference.

BACKGROUND OF THE INVENTION

1. Field of the Invention

This invention relates to a hydraulic device for hydraulic consumers for use in a production machine, particularly in an injection molding machine for processing synthetic materials or comparable plastic or plasticizable masses, comprising at least one control valve with at least three control positions; the control valve being regulable by at least one transducing means associated to a supply line by comparison of actual values with preset nominal values programmable in a control unit, whereby a variable capacity pump feeds consumers with fluid via the supply line leading over the control valve. The hydraulic device furthermore comprising a back flow pipe and a feedback line connecting a controlling device of the variable capacity pump with the supply line downstream of the control valve with the purpose of adjusting the pump output so as to maintain a constant operational pressure gradient.

2. Description of the Prior Art

A hydraulic device of this kind is disclosed in German Patent 31 19 095. In this device, the energy consumption of the variable capacity pump is adapted to a lower limit of the respective power requirements, by choosing as a basis for the operation and the control a just sufficient constant operational pressure gradient, presettable at the controlling device of the variable capacity pump. On the other hand, the known control device is adaptable to extremely different operational conditions, since a quantity, or pressure adjustment, diverging from the nominal value preset of the control valve is feedbackable alternatively by pressure transducers, distance detectors or distance potential transformers to the nominal value in the control circuit. However, such an appliance only can influence the influx side of the consumer.

A further hydraulic device is known from U.S. Pat. No. 4,823,551. In this device the supply lines are alternatively in connection with a common feedback line by means of a shuttle valve. The branch supply line, having an inferior pressure, is provided with a controller for fully stabilizing a nominal value deviation of the feeding current conditioned by a pressure asymmetry. Certainly, this method of simultaneously supplying several hydraulic consumers by the variable capacity pump is possible, however, only the influx side of the consumers is influenceable.

U.S. Pat. No. 5,129,806 discloses a hydraulic device for a consumer provided with a 4/4-way valve which is adapted to effect a differential switching, making it possible to feed the pressure line with fluid ousted by the consumer via a derived circuit provided with a nonreturn valve. In fact, the discharge of the fluid can be effected by an overlying pressure regulation, however, the expenditure involved is considerable, since a separate control valve has to be associated to each consumer.

SUMMARY OF THE INVENTION

It is an object of the invention to provide a hydraulic device which is of the kind described first hereinbefore, so that a precise and energy saving regulation or control of the consumers in both directions of flow transferred can be effected by a control valve at a reasonable price.

That object is accomplished in accordance with the invention in that the back flow pipe is also conducted via a control valve, and the consumers are connected with the control valve by connecting valves, each of them associated to one of the consumers. Furthermore, at least one transducing means is associated to the back flow pipe, which in connection with the first transducing means of the supply line constitutes a regulating variable for the control unit.

Such an arrangement offers the advantage that the respective consumers do not need a direction valve, since the physical variables such as velocity, number of revolutions, position, pressure or force, are controlled or regulated in both directions of flow transferred. The consumers are merely connected by connecting valves thus allowing a simple control, which at the same time is easy to maintain. Since the influx side as well as the reflux side can be controlled or regulated, an improved and more comfortable control, compared with the prior art, can be realized, in spite of the cost reduction. Thereby, the disadvantage that arises with a higher self-oscillation conduit, caused by the distance from the control valve to the consumer, which reduces the dynamics of the control, is consciously accepted, since these effects are compensated for by the advantages gained with it. In this arrangement, no additional switching magnets are required at additional valves, and the loss of dynamic control can be partially compensated for by the possibilities to influence the influx and the reflux. The reduction of the number of additional valves between pump and consumer additionally leads to a diminution of the loss of pressure, so that the hydraulic device still can deal economically with the energy being at its disposal. Thereby, the basic conditions for a central velocity, pressure and position control for the hydraulic circuit of the injection molding machine are created by a superset electronic control or regulation device. The control valve acts together with the variable capacity pump like an influx control.

According to a preferred feature, a respective just catching control edge of the control valve derates the fluid being ousted by the consumer in a discharge. Due to this arrangement, it is possible to control acceleration and reduction of speed in case cylinders or hydromotors are applied. Such a construction is necessary, especially for positioning and force control according to the principle of hydraulic full bridge.

According to a preferred feature, further variable capacity pumps are additionally connectable in both flow directions in a connection line between the first and further variable capacity pumps by an additional connecting valve. The further variable capacity pumps, together with the first variable capacity pump, are associated with several control circuits with several control valves regulated by a control unit. Due to the application of several variable capacity pumps connected side by side, in such an arrangement it is possible to either increase the volume flow at one control valve if necessary, or to provide several control or regulation circuits in parallel, whereby the pump capacity of the particular variable capacity pumps might be partially arranged in a cascade, which contributes to energy saving.

According to a preferred feature, an accumulator is feedable by the variable capacity pump via a 2/2-way valve and a line, the accumulator being dischargeable over the line. In such an arrangement where an accumulator is additionally connected, volume flows momentarily not required can be loaded in the accumulator and subsequently discharged over one or several control or regulation circuits. This is especially perceptible in an energetically favorable operating method, if several control circuits are connected. Further, a high speed can be controlled by the accumulator.

According to a preferred feature, the control valve is a 4/4-way valve; its forth control position generates a differential switching for feeding the fluid ousted by the consumer into a pump branch, being overbridged by the 4/4-way valve via a derived circuit provided with a nonreturn valve. In such an arrangement, a high speed can be achieved by recirculation of the ousted oil into the pump branch in spite of an energetically favorable operating method.

DETAILED DESCRIPTION OF THE PREFERRED EMBODIMENTS

The invention will now be described in more detail by example with reference to, the embodiments shown in the Figures. It should be kept in mind that the following described embodiments are only presented by way of example and should not necessarily be construed as limiting the inventive concept to any particular physical configuration.

The hydraulic device is meant for hydraulic consumers V. In the preferred embodiment, the hydraulic device is used in an injection molding machine for processing synthetic materials or comparable plastic or plasticizable masses such as, for example, ceramic masses. According to FIG. 1, the device is provided with a 4/3-way valve with three switching positions serving as a control valve 15. Control valve 15 is at least adjustable by at least one first transducing means by comparison of actual values with preset nominal values programmable in a control unit R. The variable capacity pump 18 feeds the consumers V via a first line 19 leading over the control valve. Possible consumers might, for example, be injection cylinders, dosing motors, mold closing units, ejectors, core pullers or other aggregates.

Figure 1:
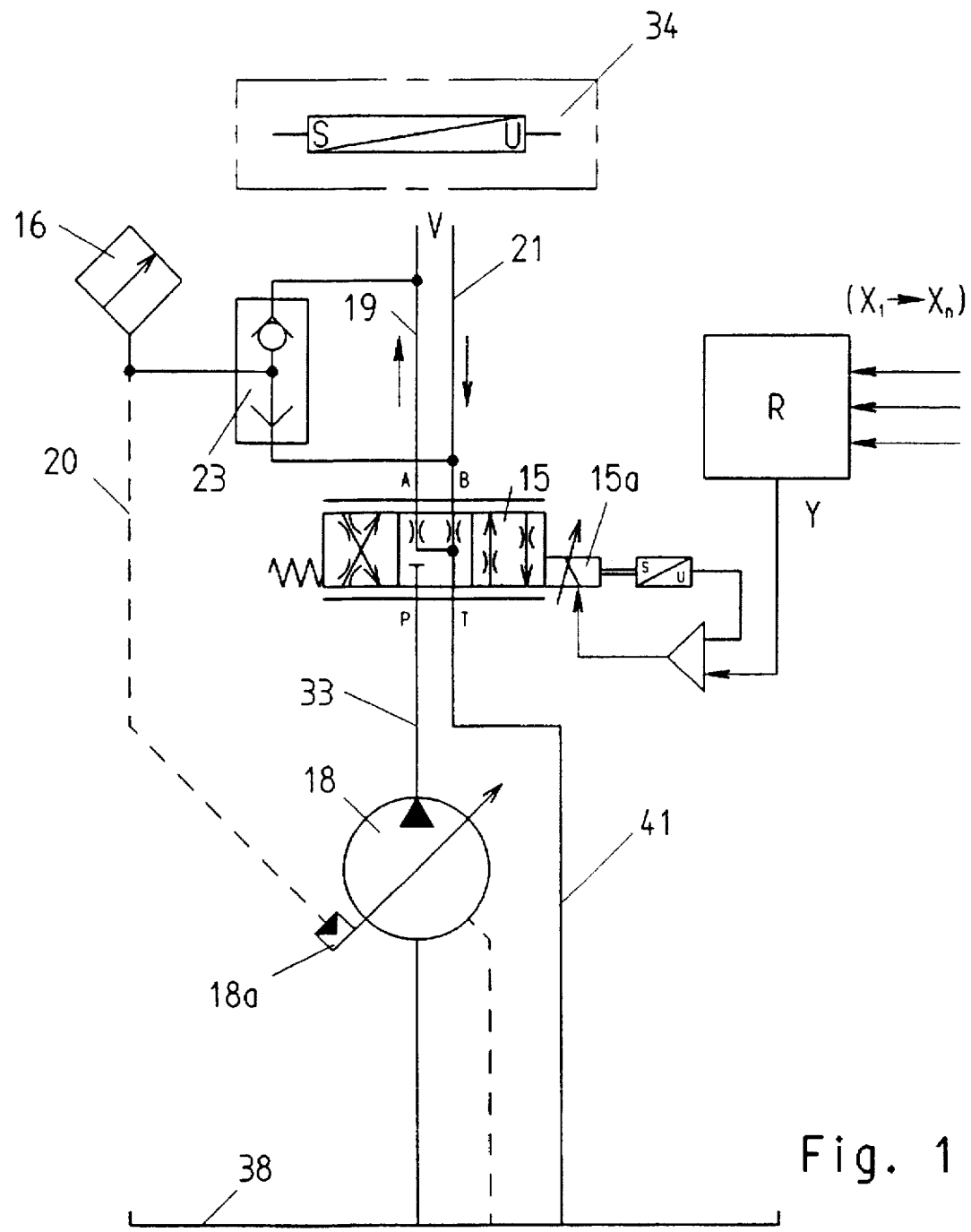
FIG. 1 is a schematic view of the hydraulic device.

As can be seen from FIG. 1, a second line 21 is also led over the centrally arranged control valve 15. First and second lines 19,21 can function as both a supply line and as a back flow line. A central arrangement of the control valve 15 is advantageous if the friction losses on the first lines 19 need to be kept as low as possible.

The control valve 15 is in connection with the consumers (FIG. 2) by connecting valves 22, each one of them associated with a respective consumer. A second transducing means is also associated with the second line 21. The transducing means can include two pressure transducers 16, 17 for collection of the differential pressure, a pressure transducer for acquisition of the maximum pressure in both lines, or one single or several transducers for registration of the position or velocity. Thus, a quantity is acquired that plays back the conditions on both sides of the consumer (i.e., supply and backflow), whereby this quantity can be acquired for both sides together by using only one transducing means. Thus, the transducing means provide actual values as input quantities for the control unit R. Basically, pressure transducers, velocity transducers, position coverage means or the like are provided as the transducing means.

According to the position of the control valve, the function of first line 19 and second line 21 can be interchanged. For example, when the control valve is in position P-A the line which actually reacts as the supply line is the first line 19, and when the control valve is in position P-B it is the second line 21 that actually reacts as the supply line.

Figure 2:
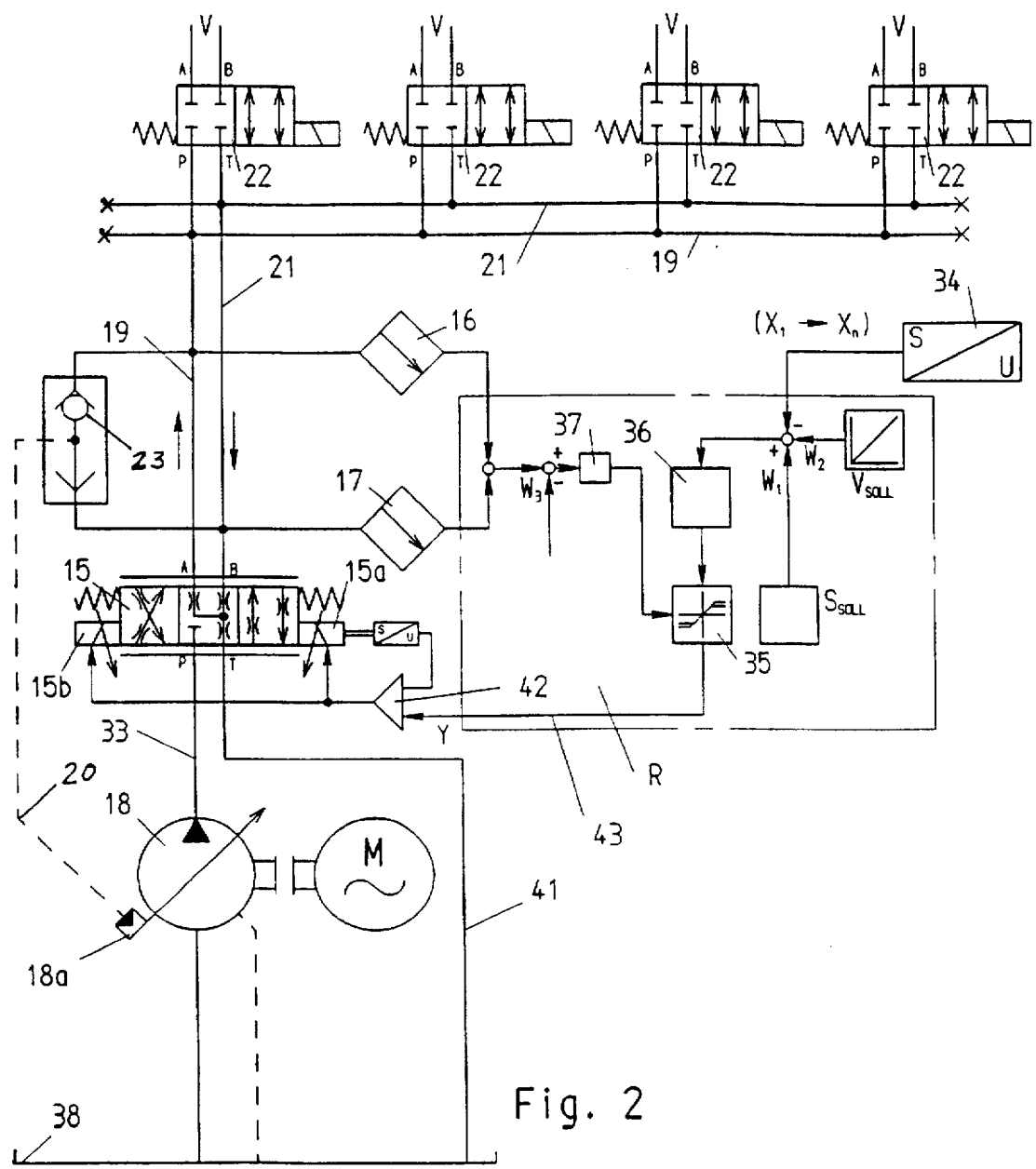
FIG. 2 shows the hydraulic device according to FIG. 1 and the control unit when applied to an injection molding machine for processing plastic materials.

The fluid discharged by the consumer is always derated (i.e., throttled) when discharged by the just catching control edge (either B-T or A-T, depending on the position of the control valve) of the control valve. The middle control position of the control valve is a stopping position permitting a locking, for example, during the dwell pressure phase of the injection molding machine. The control valve can be either directly controlled or pilot controlled, and be provided with one or two control magnets 15a, 15b. Preferably, two control magnets should be used for safety reasons, as shown in FIG. 2. The feedback of the actual pressure value to the controlling device 18a, 18a' (see also FIG. 3) of the variable capacity pump 18,18' is effected by a shuttle valve 23, 23'. Alternatively, it is also possible to provide, for example, way valves, control taps at the control valve or an external pressure feeding. The feedback, as well as the adjustment of the variable displacement pump, is effected in connection with the superset electronic control unit R. The feedback ensures that the variable capacity pump 18 supplies a variable, impressed volume flow Q1.

Figure 3:
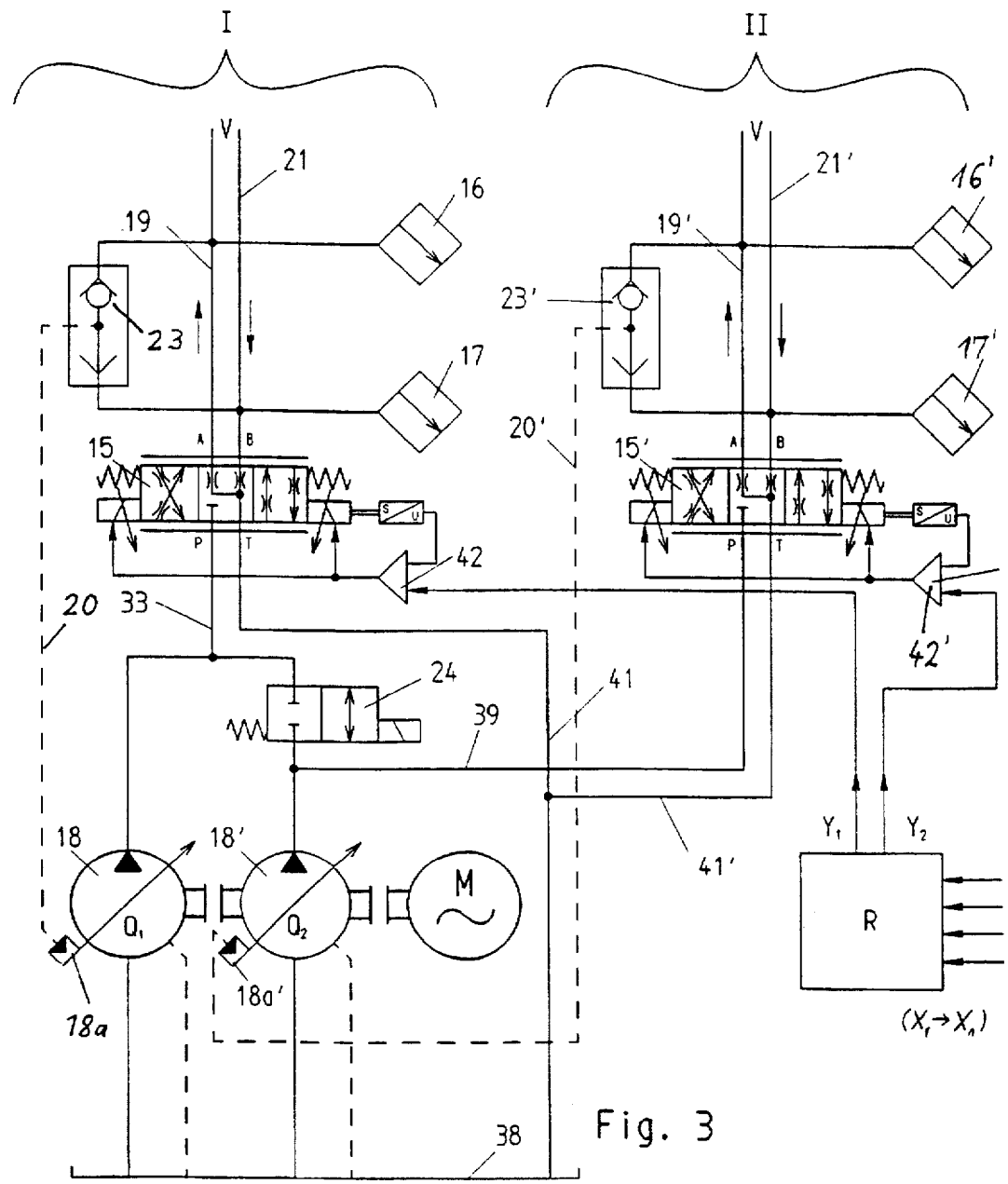
FIG. 3 shows the hydraulic device provided with several variable capacity pumps and several control circuits.

FIG. 3 presents an arrangement of the invention in which a further variable capacity pump 18' with a volume flow Q2 is assigned in conjunction with the variable capacity pump 18. Basically, the variable capacity pump 18 is used for the control (regulator) circuit I and the second variable capacity pump 18' is for the second control (regulator) circuit II. Both control circuits are largely structured identically, so that the reference characteristics of the first control circuit, additionally provided with an apostrophe for differentiation, are used for the elements of the second control circuit. In the second control circuit, the consumer is supplied via the first line 19' and the second line 21' is conducted over the control valve 15'. The pressure transducers 16',17' are connected by the shuttle valve 23 with the variable capacity pump 18' using the feedback line 20'. The recycled oil goes to the tank (reservoir) 38 (only partially shown) downstream of the control valves 15,15'. Both variable capacity pumps 18, 18' are interconnected by a connection line 39. In this line, a further connecting valve 24 is provided. According to the application desired, the complete volume flow Q2 or a partial volume flow can be additionally connected to the volume flow Q1 of the variable capacity pump 18. However, this additional connection is also possible into the other direction of flow transferred, so that both control circuits, as the need arises, can be always supplied with the respective volume flow required. The reflux downstream of the control valve to the tank 38 is effected via the lines 41,41'.

Figure 4:
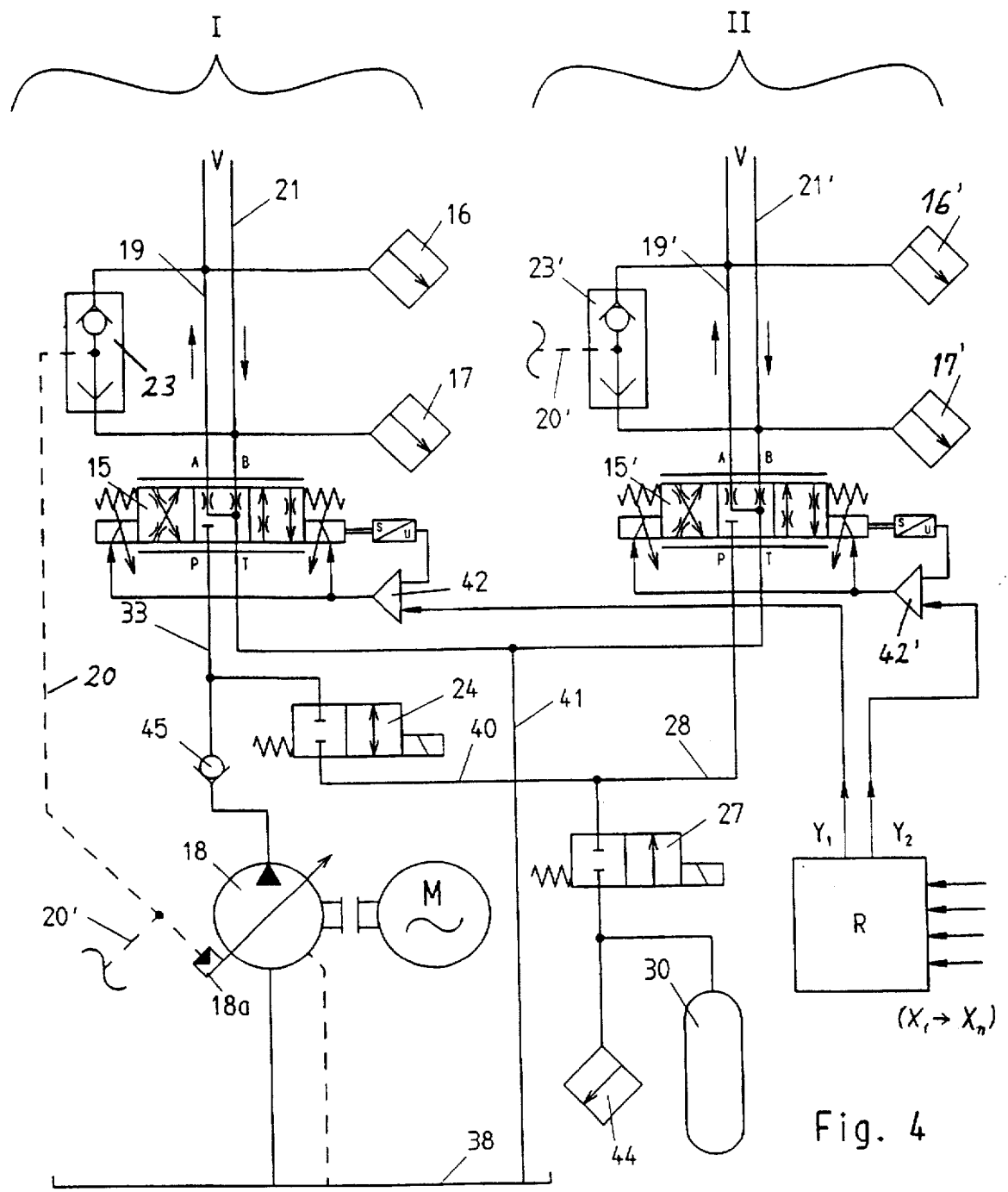
FIG. 4 shows the hydraulic device with its associated accumulator.

In FIG. 4, an accumulator 30 is added to the control circuits I and II. The Figure thereby presents a variable capacity pump 18, regulated by the influx side, which supplies the accumulator 30 via the line 40 and the 2/2-way valve 27, provided that the control valve 15' is in its middle position. The 2/2-way valve 27 is opened for filling the accumulator and the pressure is registered by the pressure transducer 44. As a result, if the 2/2-way valve 27 is closed, the control circuits I and II can be supplied by the variable capacity pump in the way already described. The 2/2-way valve can be, for example, a cartridge valve. If the accumulator is filled, it can be discharged over the line 28 or 40 into each of the control circuits as necessary. That way, it is for example possible to effect a high speed control. In order to avoid a reflux from the accumulator 30 to the variable capacity pump during the discharge action, a nonreturn valve 45 is provided in the pump branch 33.

Figure 5:
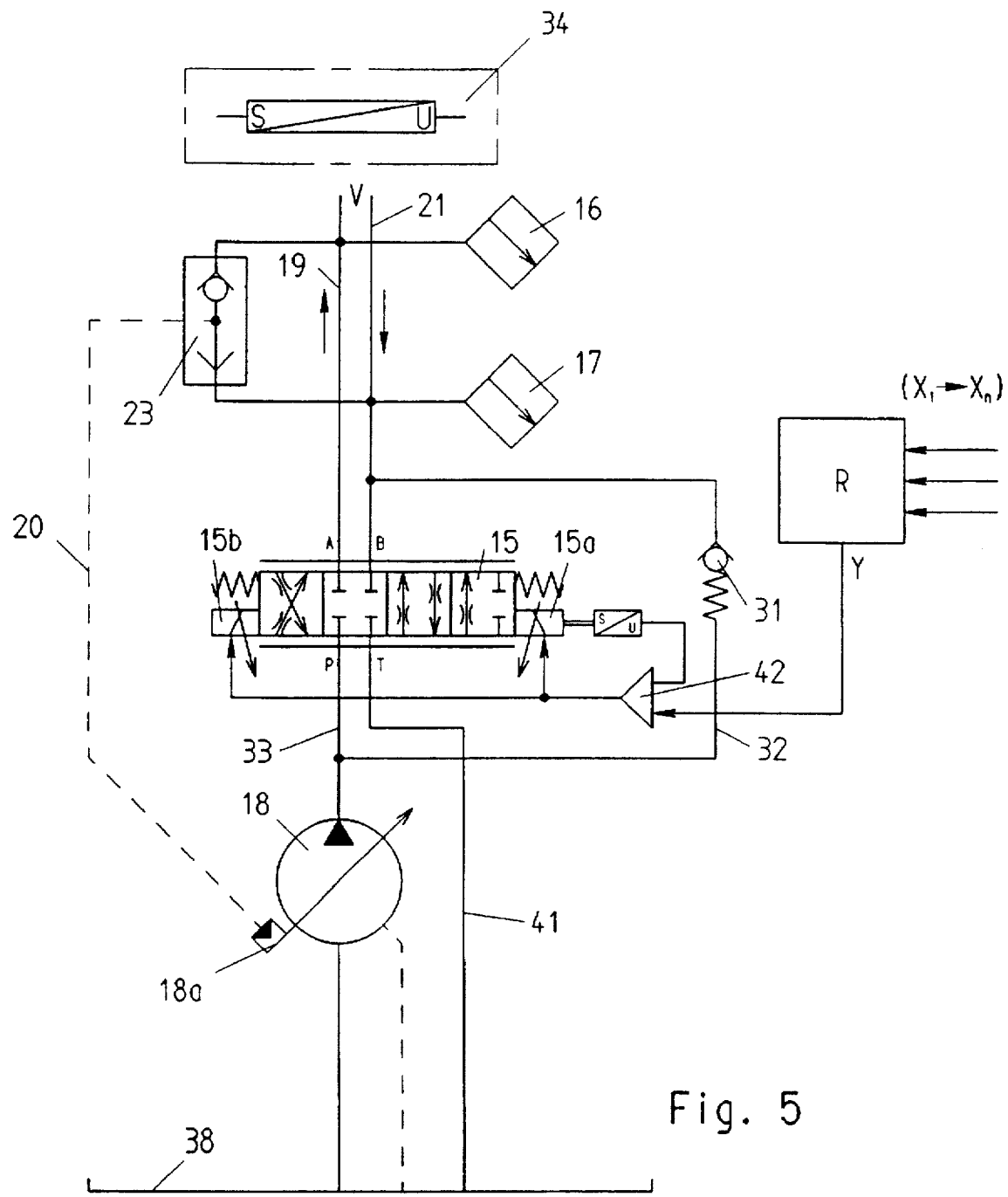
FIG. 5 shows the hydraulic device provided with a 4/4-way valve.

In FIG. 5, a 4/4-way valve, which has a forth control position, is used instead of a control valve, the rest of the construction of the hydraulic device remaining largely identical. In this position, a differential switching is possible for feeding the fluid discharged by the consumer into a pump branch 33, the 4/4-way valve being overbridged by a derived circuit 32 provided with a nonreturn valve 31. In this way it is possible to, achieve an approximately 30% higher speed, if the operating method is favorable with respect to energetics.

FIG. 2 furthermore shows the electronic control unit R in more detail with respect to its circuits. It works on the principle of a multivariable control system of either analog or digital construction. At least one first transducing means 16, and preferably a first and a second transducing means 16, 17, are provided for each control valve. These transducing means transmit the actual pressure or force values to the pressure controller 37, for comparing the actual values with preset nominal values to determine the command variable W3 for the pressure and force regulation. In particular, transducing means 16 measures the actual pressure in the first line 19, and transducing means 17 measures the actual pressure in the second line 21. At the junction of the lines coming from the respective transducing means, the signal generated by transducing means 17 is subtracted from the signal generated by transducing means 16. The resulting difference is then subtracted from the preset nominal value $P_{soll}$, the result of which determines the pressure command variable W3.

Since first line 19 supplies the consumers, and whereas second line 21 is a backflow line, the resulting difference between the pressure values will be a positive number. However, it is also possible that the first and second lines may be reversed, i.e., the first line 19 being a backflow line, and second line 21 being connected to the consumers, with the resulting difference being a negative number. Thus, to compensate for this possibility, the value subtracted from $P_{soll}$ could be the absolute value of the resulting difference between the two transducing means values. Alternatively, if the resulting difference is negative, $P_{soll}$ could be likewise set as a negative value. The actual values for positioning X1 to Xn are ascertained in the distance potential transformer 34 and compared with the nominal positioning value $S_{soll}$, whereby the command variable W1 for positioning is determined. The velocity is compared with the nominal velocity $V_{soll}$, whereby the command variable W2 for velocity is determined. The appertaining actual values are acquired analogy or digitally by transducing means adapted to acquire actual values. The command variable W2 for velocity or the command variable W1 is superset, and the command variable W3 for the pressure and force regulation has a limiting effect in the limiting means 35 with regard to the actual positioning variable y respectively y1, y2. Then the positioning variables are transmitted to the comparator device 42 via the signal line 43, which compares the actual position of the control valve with the positioning variable, and if necessary arranges for an adjusting movement of the control valve. The velocity can be controlled or adjusted in the sense of automatic control technic. The control circuit is closed by the electronic control unit. If purely pressure and force regulation is required, reversible controller networks could also be applied.

It will be understood that the above description of the present invention is susceptible to various modifications, changes and adaptations, and the same are intended to be comprehended within the meaning and range of equivalents of the appended claims.

I claim:

1. A hydraulic device for supplying a fluid to a plurality of hydraulic consumers of an injection molding machine, comprising:

a reservoir for the fluid;

a variable capacity pump connected to said reservoir for feeding the consumers with the fluid from said reservoir, said pump having a controlling device for controlling a flow of the fluid from said pump;

a sole control valve connected to said pump, and having at least three selectable control positions each defining a different flow path of the fluid;

a first connecting line connecting said sole control valve with a first and second consumer;

a second connecting line connecting said sole control valve with the first and the second consumer, said first and second connecting lines selectively serving as a discharge connecting line for providing said sole control valve with the fluid discharged from the consumers, and a feed connecting line for supplying the consumers with the fluid from said sole control valve, respectively, in dependence of a selected control position of said sole control valve;

a control unit programmable with preset nominal values;

first transducing means connected to said control unit and being in communication with said first connecting line for measuring an adjusted actual value and generating a signal in relation thereto;

second transducing means connected to said control unit and being in communication with said second connecting line for measuring an adjusted actual value and generating a signal in relation thereto, the signals of said first and second transducing means being transmitted to said control unit and being compared with the preset nominal values in said control unit for forming a regulating variable therein; the control positions of said sole control valve being controlled in a closed loop arrangement by said control unit as a function of the regulating variable, whereby said control valve simultaneously controls both an influx flow and a reflux flow of the fluid through the first and second consumers;

first and second 4/2-way connecting valves being in communication with said first and second consumers, respectively, and being arranged in said first and second connecting lines for establishing a fluid connection between the first and second consumers and said control valve; and a feedback line connected to said controlling device and connecting said controlling device with said first and second connecting lines, said controlling device responding to a highest pressure of a first pressure within said first connecting line and of a second pressure within said second connecting line by continuously adjusting an output of said pump in a closed loop arrangement to maintain a constant operational pressure gradient between said pump and a position downstream of said control valve.

2. A hydraulic device as described in claim 1, wherein said control unit includes means for determining a condition at an input and an output of each said consumer based on the adjusted actual values.

3. A hydraulic device as described in claim 1, wherein said control valve has a control edge that throttles the fluid being discharged by a respective consumer.

4. A hydraulic device as described in claim 1, wherein one of the three control positions of said control valve comprises a middle control position for stopping a flow of the fluid.

5. A hydraulic device as described in claim 1, further comprising a third connecting line, an additional connecting valve, and an additional variable capacity pump; wherein said third connecting line connects said variable capacity pump and said additional variable capacity pump together via said additional connecting valve.

6. A hydraulic device as described in claim 1, further comprising a third 2/2-way valve, a third connecting line connected to said third 2/2-way valve, and an accumulator being feedable through said third connecting line and said third 2/2-way valve by said variable capacity pump and being dischargeable through said third connecting line.

7. A hydraulic device as described in claim 1, wherein said control valve comprises a 4/4-way valve having four control positions, the forth control position generating a differential switching for feeding the fluid discharged by a respective consumer through a derived circuit line having a nonreturn valve and into a pump branch, said derived circuit bypassing said control valve.

8. A hydraulic device as described in claim 1, wherein said control unit is an electronic control unit; further comprising a plurality of additional transducing means in communication with said consumers for acquiring additional regulating variables, said additional regulating variables being processed in a closed loop in said electronic control unit for determining an actual positioning variable.

9. A hydraulic device as described in claim 8, said electronic control unit including means for controlling velocity using a superset command variable, and means for controlling pressure and force using a command variable having a limiting effect with respect to said actual positioning variable.

10. A hydraulic device as described in claim 8, said electronic control unit including a superset command variable for a control of positioning, and a command variable for a control of pressure and force having a limiting effect with respect to said actual positioning variable.

* * * * *

UNITED STATES PATENT AND TRADEMARK OFFICE
CERTIFICATE OF CORRECTION

PATENT NO.   : 5,634,334
DATED        : June 3, 1997
INVENTOR(S)  : Karl Hehl

It is certified that error appears in the above-indentified patent and that said Letters Patent is hereby corrected as shown below:

In the drawing, Fig. 2 should appear as shown below.

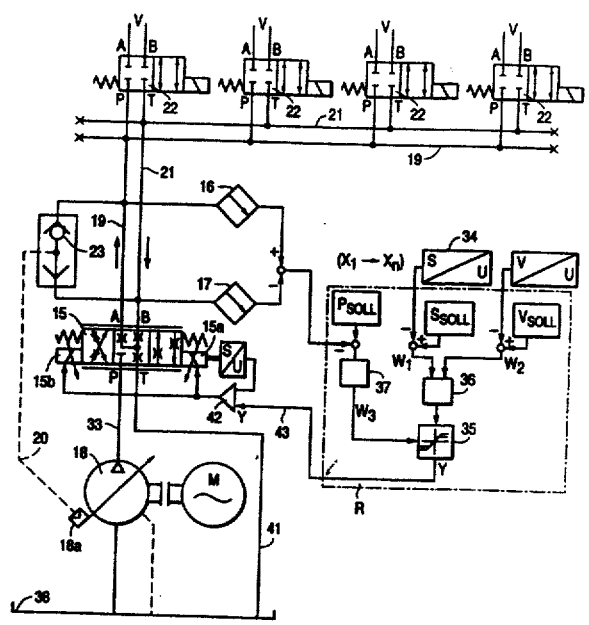

Signed and Sealed this

Nineteenth Day of August, 1997

Attest:

BRUCE LEHMAN

Attesting Officer

Commissioner of Patents and Trademarks